(12) United States Patent
Meehan

(10) Patent No.: US 11,467,056 B2
(45) Date of Patent: Oct. 11, 2022

(54) SENSING LEAK IN A MULTI-SEAL SEALING ASSEMBLY WITH SENSORS

(71) Applicant: Saudi Arabian Oil Company, Dhahran (SA)

(72) Inventor: Martin F. Meehan, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 330 days.

(21) Appl. No.: 16/671,500

(22) Filed: Nov. 1, 2019

(65) Prior Publication Data

US 2021/0131907 A1 May 6, 2021

(51) Int. Cl.
*G01M 3/28* (2006.01)

(52) U.S. Cl.
CPC ................. *G01M 3/2869* (2013.01)

(58) Field of Classification Search
CPC ..... G01M 3/2869; G01M 3/26; G01M 3/2853
See application file for complete search history.

(56) References Cited

U.S. PATENT DOCUMENTS

| | | |
|---|---|---|
| 3,504,855 A | 4/1970 | Hulsey |
| 3,837,713 A | 9/1974 | Masuda et al. |
| 4,477,057 A | 10/1984 | Freiss |
| 4,553,759 A | 11/1985 | Kilmoyer |
| 4,848,729 A | 7/1989 | Danzy |
| 5,338,003 A | 8/1994 | Beson |
| 5,542,645 A | 8/1996 | Beson |
| 5,584,271 A | 12/1996 | Sakata |
| 6,592,126 B2 | 7/2003 | Davis |
| 7,770,899 B1 | 8/2010 | Durham |
| 8,061,211 B1 | 11/2011 | Bennett |
| RE47,010 E | 8/2018 | Crochet, Sr. et al. |
| 2001/0030396 A1 | 10/2001 | Pecht et al. |
| 2010/0320411 A1 | 12/2010 | King |
| 2017/0108399 A1* | 4/2017 | Rhee ................. G01M 13/005 |
| 2019/0301966 A1 | 10/2019 | Pillar |

FOREIGN PATENT DOCUMENTS

| | | |
|---|---|---|
| DE | 10143733 | 2/2003 |
| DE | 10143733 A1 * | 2/2003 |
| WO | WO 2008061343 | 5/2008 |

OTHER PUBLICATIONS

PCT International Search Report and Written Opinion in International Appln. No. PCT/US2020/058114, dated Febmaty 25, 2021, 13 pages.

* cited by examiner

*Primary Examiner* — David Z Huang
(74) *Attorney, Agent, or Firm* — Fish & Richardson P.C.

(57) ABSTRACT

A multi-seal sealing assembly with sensors includes a housing, a first sensor and a second sensor. The housing can receive multiple seals and can mount to a surface of a tool. The multiple seals are configured to seal against fluid flow between the surface of the tool and the housing. Multiple sensors corresponding to the multiple seals are mounted to the housing adjacent respective seals and between the housing and the surface of the tool. The sensors sense a flow parameter at different levels responsive to an absence or a presence of fluid flow past the seals.

21 Claims, 5 Drawing Sheets

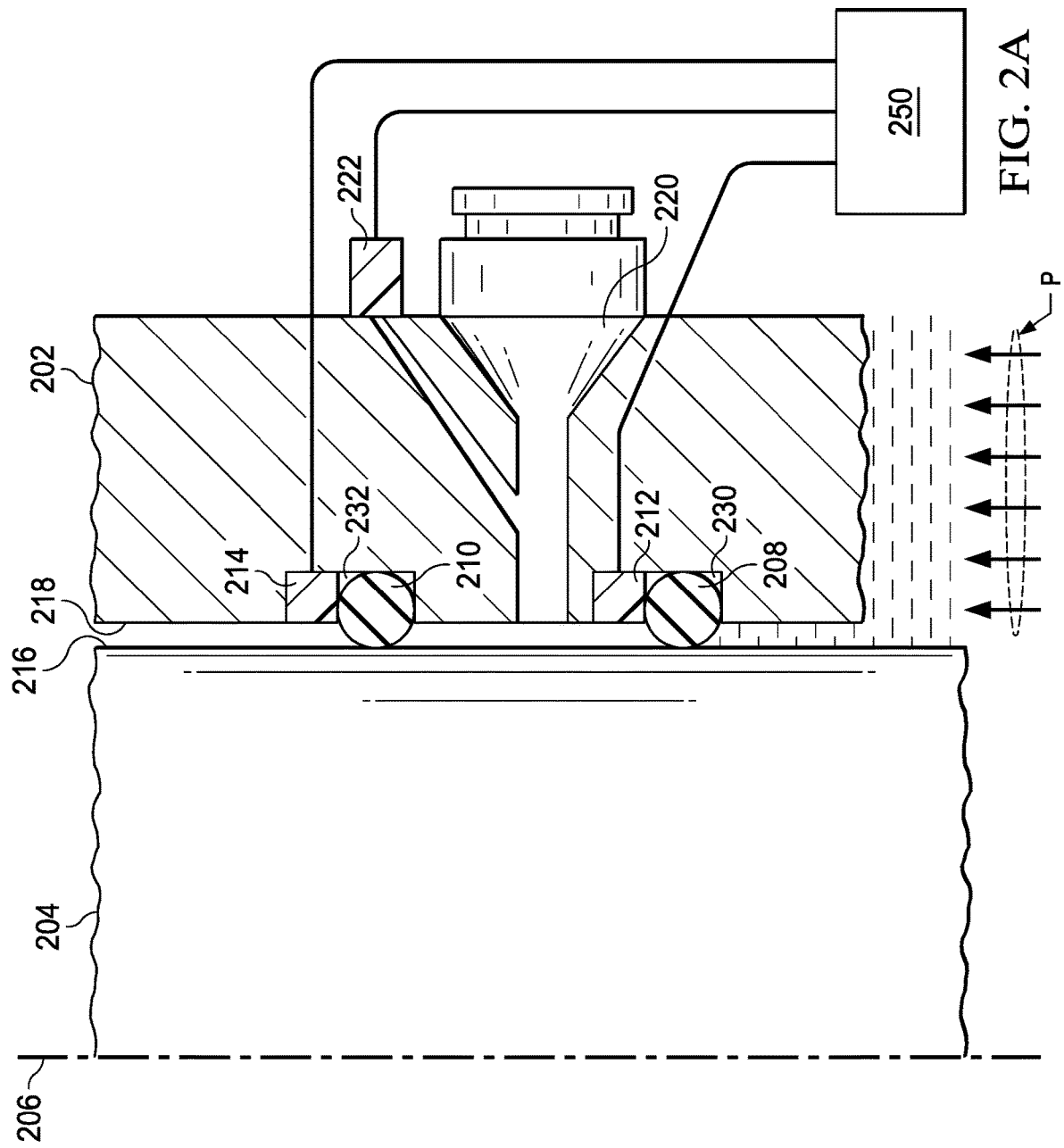

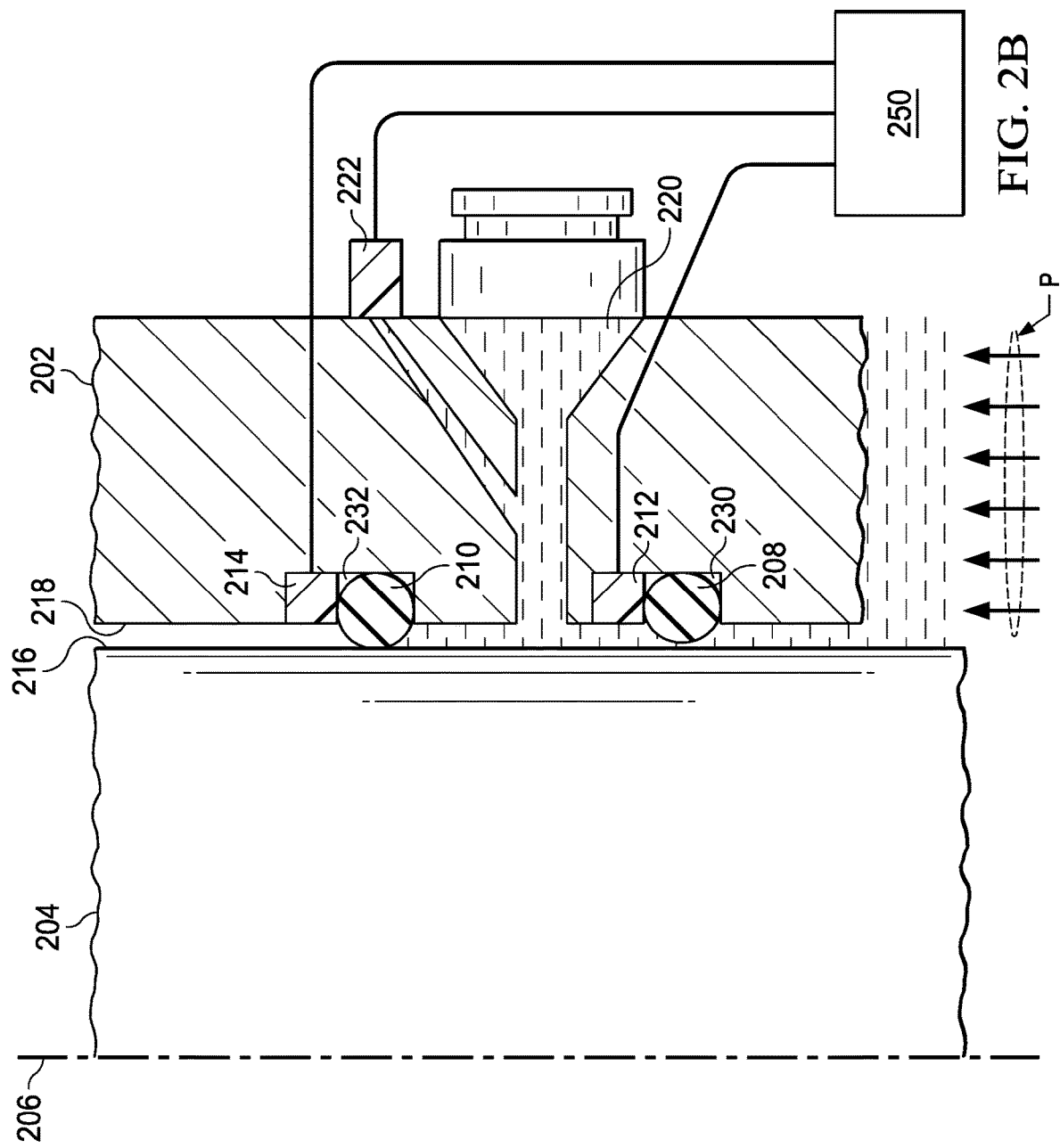

_(1)_

SENSING LEAK IN A MULTI-SEAL SEALING ASSEMBLY WITH SENSORS

TECHNICAL FIELD

This disclosure relates to sealing against fluid flow.

BACKGROUND

Fluid flow through a body, for example, an elongated pipe, an annulus formed by two concentric pipes, and the like, is regulated using valves. Valves consist of multiple parts and complex joints assembled together with one or more sealing elements for containing and controlling fluid flow through the body. A sealing element (sometimes called a seal) includes a sealing surface that contacts a surface of the body. The contact between the sealing surface and the surface of the body is such that fluid cannot flow between the two surfaces. A leak develops when the contact between the two surfaces weakens, the sealing surfaces are damaged, or the seal degrades, for example. Other causes for leak include poor workmanship where a seal or sealing surface is damaged during assembly, corrosion from poor quality test fluid before service, corrosion from process medium during service, combination of chemical and thermal seal degradation, cyclic thermal or pressure (or both) degradation, rapid gas explosive decompression, mechanical abrasion where body and tool surface contact each other and score their metallic surfaces, accumulation of solids adjacent to the seal which tend to get pulled inward when the tool is a dynamic part or any combination of them.

SUMMARY

This specification describes technologies relating to sensing leaks in a multi-seal sealing assembly with sensors.

Certain aspects of the subject matter described here can be implemented as a sealing assembly. The assembly includes a housing, a first sensor and a second sensor. The housing is configured to receive multiple seals including a first seal and a second seal. The housing is configured to mount to a surface of a tool. The multiple seals are configured to seal against fluid flow between the surface of the tool and the housing. The first sensor is mounted to the housing adjacent the first seal and between the housing and the surface of the tool. The first sensor is configured to sense a first flow parameter at a first level responsive to an absence of the fluid flow past the first seal and the first flow parameter at a second level different from the first level responsive to a presence of the fluid flow past the first seal. The second sensor is mounted to the housing adjacent the second seal, between the housing and the surface of the tool and downstream of the first sensor. The second sensor is configured to sense a second flow parameter at a third level responsive to an absence of the fluid flow past the second seal and the second flow parameter at a fourth level different from the third level responsive to a presence of the fluid flow past the second seal.

An aspect combinable with any of the other aspects can include the following features. The housing includes a housing surface configured to attach to the surface of the tool. The housing surface defines multiple recesses for the corresponding multiple seals. The multiple recesses include a first recess to receive the first seal and a second recess to receive the second seal. The first sensor is mounted adjacent the first recess and the second sensor is mounted adjacent the second recess.

An aspect combinable with any of the other aspects can include the following features. The second recess is downstream of the first recess when the housing is mounted to the tool.

An aspect combinable with any of the other aspects can include the following features. The housing defines a flow pathway between the first seal and the second seal. The flow pathway is configured to fluid toward or away from the surface of the tool. The assembly includes a third sensor mounted to the housing and fluidically coupled to the flow pathway. The third sensor is configured to sense a third flow parameter at a fifth level responsive to an absence of the fluid flow through the flow pathway and at a sixth level different from the fifth level responsive to a presence of the fluid flow through the flow pathway.

An aspect combinable with any of the other aspects can include the following features. Each of the first sensor, the second sensor and the third sensor is a pressure sensor, a load sensor, a contact sensor, a flow rate sensor or a temperature sensor.

An aspect combinable with any of the other aspects can include the following features. Each of the first sensor, the second sensor and the third sensor is a pressure sensor. Each of the first flow parameter, the second flow parameter and the third flow parameter is fluid pressure.

An aspect combinable with any of the other aspects can include the following features. Each of the first sensor, the second sensor and the third sensor is a contact sensor. Each of the first flow parameter, the second flow parameter and the third flow parameter is fluid wettability.

An aspect combinable with any of the other aspects can include the following features. Each of the first sensor, the second sensor and the third sensor is a load sensor. Each of the first flow parameter, the second flow parameter and the third flow parameter is a force exerted by the fluid flow.

An aspect combinable with any of the other aspects can include the following features. The assembly includes a controller operatively coupled to the multiple seals. The controller is configured to determine a presence of a leak of fluid between the housing and the surface of the tool based on the presence or the absence of the fluid flow past each of the multiple seals.

An aspect combinable with any of the other aspects can include the following features. The controller is configured to determine the presence of the leak responsive to either the first sensor sensing the first flow parameter at the second level or the second sensor sensing the second flow parameter at the fourth level or both.

Certain aspects of the subject matter described here can be implemented as a method. A first ring seal is mounted at a first location on a surface of a housing. A first sensor is attached to the housing adjacent the first ring seal. The first sensor is configured to sense a first flow parameter at a first level responsive to an absence of the fluid flow past the first ring seal and the first flow parameter at a second level different from the first level responsive to a presence of the fluid flow past the first ring seal. A second ring seal is mounted at a second location displaced from the first location on the surface of the housing. A second sensor is attached to the housing adjacent the second ring seal. The second sensor is configured to sense a second flow parameter at a third level responsive to an absence of the fluid flow past the second ring seal and the second flow parameter at a fourth level different from the third level responsive to a presence of the fluid flow past the second ring seal. The housing, with the first ring seal, the first sensor, the second ring seal and the second sensor, is attached to a surface of a tool. The first ring seal and the second ring seal are configured to seal against fluid flow between the surface of the housing and the surface of the tool. The second ring seal is downstream of the first ring seal with reference to a direction of the fluid flow. A presence of a leak of fluid between the housing and the surface of the tool is monitored based on the presence or the absence of the fluid flow past each of the first ring seal and the second ring seal.

An aspect combinable with any of the other aspects can include the following features. To mount the first ring seal at the first location, the first ring seal is attached to a first recess formed in a housing surface of the housing. To attach the first sensor to the housing adjacent the first ring seal, the first sensor is attached adjacent the first recess.

An aspect combinable with any of the other aspects can include the following features. To mount the second ring seal at the second location, the second ring seal is attached to a second recess formed in a housing surface of the housing. To attach the second sensor to the housing adjacent the second ring seal, the second sensor is attached adjacent the second recess.

An aspect combinable with any of the other aspects can include the following features. The housing defines a flow pathway between the first ring seal and the second ring seal. The flow pathway is configured to flow fluid toward the surface of the tool or away from the surface of the tool. A third sensor is attached to the housing. The third sensor is configured to sense a third flow parameter at a fifth level responsive to an absence of the fluid flow through the flow pathway and at a sixth level different from the fifth level responsive to a presence of the fluid flow through the flow pathway. The third sensor is fluidically coupled to the flow pathway. The presence of the leak of the fluid between the housing and the surface of the tool is monitored based on the presence or the absence of the fluid flow through the flow pathway.

An aspect combinable with any of the other aspects can include the following features. Each of the first sensor, the second sensor and the third sensor is a pressure sensor. Each of the first flow parameter, the second flow parameter and the third flow parameter is fluid pressure.

An aspect combinable with any of the other aspects can include the following features. Each of the first sensor, the second sensor and the third sensor is a contact sensor. Each of the first flow parameter, the second flow parameter and the third flow parameter is fluid wettability.

An aspect combinable with any of the other aspects can include the following features. Each of the first sensor, the second sensor and the third sensor is a load sensor. Each of the first flow parameter, the second flow parameter and the third flow parameter is a force exerted by the fluid flow.

Certain aspects of the subject matter described here can be implemented as a method. A first load sensor is mounted adjacent to a first ring seal on a surface of a housing. A second load sensor is mounted adjacent to a second ring seal on the surface of the housing. The surface of the housing, with the first ring seal, the first load sensor, the second ring seal and the second load sensor, is attached to a surface of a tool. The first ring seal and the second ring seal are configured to prevent fluid flow between the surface of the tool and the surface of the housing. The second ring seal is downstream of the first ring seal with reference to a direction of the fluid flow. A presence of a leak is determined based on an increase in a load sensed by the first load sensor and an increase in a load sensed by the second load sensor relative to a baseline load sensed by the first load sensor and a baseline load sensed by the second load sensor in an absence of the fluid flow between the surface of the tool and the surface of the housing.

An aspect combinable with any of the other aspects can include the following features. The housing defines a flow pathway between the first ring seal and the second ring seal. The flow pathway is configured to flow fluid. A third load sensor is mounted to the housing and fluidically coupled to the flow pathway. The presence of the leak is determined based on an increase in a load sensed by the third load sensor relative to a baseline load sensed by the third load sensor in the absence of the fluid flow between the surface of the tool and the surface of the housing.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2A is a schematic drawing of a multi-seal sealing assembly sealing against a body.

FIG. 2B is a schematic drawing of a sensor system sensing a leak in a second portion of the multi-seal sealing assembly of FIG. 2A.

Like reference numbers and designations in the various drawings indicate like elements.

DETAILED DESCRIPTION

A seal can leak over time. The performance of the seal often cannot be determined during factory production, testing, and operation. The user of a valve will discover that a seal is ineffective only when a leak occurs. A multi-seal sealing assembly implements multiple seals such that when a primary seal fails, a secondary seal at least temporarily prevents leaks until the primary seal is repaired or replaced. Sometimes, the failure of the primary seal is determined only after the secondary seal fails. In applications involving fluid flow, for example, applications implementing pumps, actuators and the like, any leak can cause operational delays as well as necessitate emergency repairs.

This disclosure describes techniques that allow monitoring the performance of a multi-seal sealing assembly by individually monitoring the performance of each of the multiple seals in the system. In some implementations, a flow parameter sensor is positioned adjacent each seal of the multi-seal sealing assembly. Based on the flow parameter sensed by each sensor, the presence or absence of a leak in the multi-seal sealing assembly can be determined. In addition, the specific seal that is the cause of the leak can also be determined.

Such determination can allow a user to make informed, proactive decisions to prevent a leak. Such prevention can protect an operational facility from downtime, repair, and damages. Leak information can also allow the user to develop a targeted list of equipment for preventative maintenance. Doing so reduces required resources and maximizes value of the actual maintenance performed. In addition, doing so helps reduce fugitive emissions and leaks from valves which provide environmental benefits. The techniques described here can be integrated into new valves, and existing valves while maintaining current seal arrangements, for example, seal type, sealing material, seal geometry. The techniques described here can be utilized in all industries, for example, oil and gas, power, nuclear, water, aerospace, and the like, as well as all equipment which utilize seals. In addition, the sensors can replace part of a seal arrangement such as a support ring. Alternatively or in addition, the sensors described here can be located adjacent to a seal but not necessarily located in the same recess/pocket as the seal. The techniques can detect process fluid leaking from the body (egress) toward the environment. The techniques can also be applied to detect fluid leaking into the body (ingress) as an example seawater in an underwater environment. In addition the techniques can also be applied to detect leaks from two contained fluid volumes, e.g., in an underwater application, egress of process fluid from the body and ingress of environmental fluid into the body.

Figure 1A:
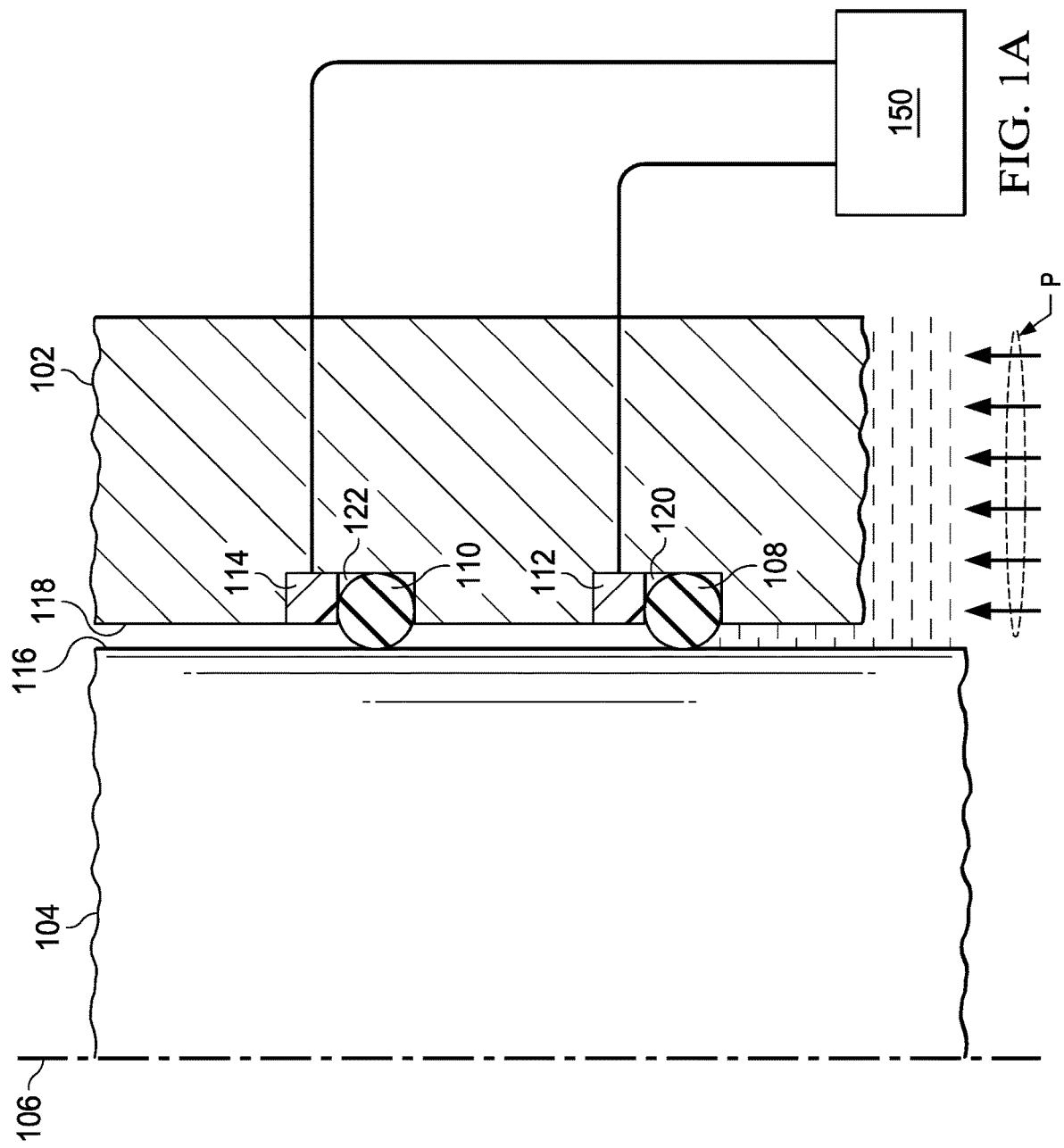
FIG. 1A is a schematic drawing of a multi-seal sealing assembly sealing against a body.

FIG. 1A is a schematic drawing of a multi-seal sealing assembly sealing against a body. In the configuration shown in FIG. 1A, the sealing assembly prevents the leak past a primary seal. The sealing assembly includes a housing 102 that receives multiple seals including a first seal 108 and a second seal 110, for example, a first ring seal and a second ring seal, respectively. Examples of seals include but are not limited to elastomeric seals (for example, o-rings), thermoplastic seals (for example, PTFE-based with or without spring energization), graphite-based seals (for example, braided rings), metallic rings (for example, RTJ type, flat gaskets, o-ring, c-ring) or any combination of them. In some implementations, one or more or all of the seals can be mounted to the tool 104 instead of the housing 102. As described later, additional seals are also possible. The housing 102 is configured to mount to a tool 104. For example, the tool 104 can be a shaft, stem, closure, piston, or other tool past which fluid flow is to be regulated/isolated using the sealing assembly. In some implementations, the multiple seals can seal against fluid flow between a surface 116 of the tool 104 and a housing surface 118 of the housing 102.

The sealing assembly includes multiple sensors; at least as many sensors as seals in the sealing assembly. In some implementations, a first sensor 112 is mounted to the housing 102 adjacent the first seal 108 and between the housing 102 and the surface 116 of the tool 104. The first sensor 112 is configured to sense a first flow parameter at a first level responsive to an absence of the fluid flow past the first seal 108 and the first flow parameter at a second level different from the first level responsive to a presence of the fluid flow past the first seal 108. For example, when the first seal 108 seals the housing 102 to fluid flow between the surface 116 of the tool 104 and the housing surface 118 of the housing 102, i.e., the first seal 108 seals against the fluid flow, the first sensor 112 can sense a first flow parameter value. When the first seal 108 leaks, thereby permitting the fluid to flow past the first seal 108 and between the surface 116 of the tool 104 and the housing surface 118 of the housing 102, the first sensor 112 can sense a second flow parameter value that is greater than or less than the first flow parameter value.

In such implementations, a second sensor 114 is mounted to the housing 102 adjacent the second seal 110 and between the housing 102 and the surface 116 of the tool 104. The second sensor 114 is downstream of the first sensor 112 with reference to a direction of fluid flow (shown in FIG. 1A by arrows and the letter "P"). In the schematic drawing of FIGS. 2A and 2B, the direction of fluid flow is parallel to the longitudinal axis 106 of the tool 104. However, in some implementations, depending on the arrangement of the seal and the surface of the tool to be sealed, the direction of fluid flow can be perpendicular to the longitudinal axis of the tool. In some implementations, the tool can be shaped such that one seal seals a surface that is parallel to the direction of fluid flow while another seal seals another surface that is perpendicular to the direction of fluid flow. In general, the multiple sensors can be arranged downstream of each other along the direction of fluid flow past the sealed surface. The second sensor 114 is configured to sense a second flow parameter at a third level responsive to an absence of the fluid flow past the second seal 110 and the second flow parameter at a fourth level different from the third level responsive to the presence of the fluid flow past the second seal 110. For example, when the first seal 108 seals against the fluid flow between the surface 116 of the tool 104 and the housing surface 118 of the housing 102 as described earlier, the second sensor 114 can sense a third flow parameter value. When the first seal 108 leaks, thereby permitting the fluid to flow past the first seal 108 and to the second seal 110, the second sensor 114 can sense a flow parameter value that is greater than or less than the third flow parameter value. In this example, the second seal 110 can seal the housing 102 to fluid flow between the surface 116 of the tool 104 and the housing surface 118 of the housing 102. In other words, even though the first seal 108 has failed, the second seal 110 seals against the fluid flow. When the second seal 110 leaks, thereby permitting the fluid to flow past the second seal 110, the second sensor 114 can sense a fifth flow parameter value that is different from the fourth flow parameter value. In this manner, the different flow parameter values sensed by the first sensor 112 and the second sensor 114 indicate the presence or the absence of a leak in the sealing assembly.

For example, the first sensor 112 can be a pressure sensor and the flow parameter value can be a pressure. In another example, the first sensor 112 is a wettability sensor that outputs one upon contacting fluid and zero in the absence of fluid, and the flow parameter value can be a wettability value. In a further example, the first sensor 112 is a load sensor that includes a sensor plate that compresses based upon a force exerted on the sensor plate by the seal force caused by the fluid. In this example, the flow parameter value is a force on the sensor plate. In another example, the first sensor 112 is a flow rate sensor that can quantify a leakage amount which can inform about an extent of seal damage. The second sensor 114 (and other sensors) can have similar properties as the first sensor 112. In some implementations, all the sensors in the sealing assembly can be of the same type. In some implementations, different types of sensors can be implemented in the same sealing assembly.

The housing surface 118 defines multiple recesses for the multiple seals. Alternatively, the surface of the tool 104 can define the recesses and the sensors can be mounted adjacent the recesses on the surface of the tool. For example, the multiple recesses include a first recess 120 and a second recess 122 to receive the first seal 108 and the second seal 110, respectively. The first sensor 112 and the second sensor 114 are mounted adjacent the first recess 120 and the second recess 122, respectively. By mounting the sensor "adjacent" the seal, it is meant that the sensor is in as close physical proximity as possible to the sensor. Also, by mounting the sensor "adjacent" the recess, it is meant that the seal is positioned within the recess and the sensor is in as close physical proximity as possible to the recess. The purpose of such mounting is so that the sensor senses the flow parameter at almost the same time instant as the corresponding seal. Also, such adjacent mounting ensures that a magnitude of the flow parameter sensed by the sensor is equal to or substantially equal to the magnitude experienced by the corresponding seal. In some implementations, the sensor can be mounted a distance away from the recess, for example, due to a geometry of the parts. In such implementations, the distance can be minimized or selected to satisfy the purpose mentioned earlier.

In some implementations, the first sensor 112 and the second sensor 114 are mounted to the housing 102 downstream of the first seal 108 and the second seal 110, respectively, with reference to the fluid flow direction. Alternatively, the sensor can be upstream of the corresponding seal with reference to the fluid flow direction. In a further implementation, one sensor can be upstream of and another sensor can be downstream of the corresponding seals, respectively. In general, the position of a sensor upstream or downstream of the corresponding sensor or seal can depend, in part, on the type of sensor used, the type of seal, and the type of flow parameter sensed.

In some implementations, each of the multiple sensors of the sealing assembly are operatively coupled (for example, via wired or wireless connections) to a controller 150. The controller 150 can be implemented as a computer-readable medium storing computer instructions executable by one or more processors to perform operations described here. Alternatively, or in addition, the controller 150 can be implemented as processing circuitry, firmware, software, or a combination of them. The controller 150 can include or be operatively connected to local feedback indicators (for example, display panel with LEDs) to identify malfunctioning seal elements. The controller 150 can receive flow parameter values from the multiple sensors over time and determine the presence or the absence of the leak based on the received flow parameter values.

For example, as described earlier, FIG. 1A shows the sealing assembly sealing against fluid flow between the surface 116 of the tool 104 and the housing surface 118 of the housing 102. The absence of the leak is schematically shown by the absence of fluid past the first seal 108 in FIG. 1A. In this configuration, the first sensor 112 senses a flow parameter value representative of an absence of fluid flow past the first seal 108. More specifically, in this configuration, the first sensor 112 is downstream of the first seal 108 with reference to the direction of the fluid flow, and, consequently, does not contact the fluid. On the other hand, if the first sensor 112 was upstream of the first seal 108 with reference to the direction of fluid flow, then the first sensor 112 would contact the fluid, and, consequently, the flow parameter value sensed by the first sensor 112 differs from the corresponding value sensed in the configuration in which the first sensor 112 is downstream of the first seal 108. In addition to determining the presence or absence of the leak based on the sensed flow parameter values received from the various sensors, the controller 150 can additionally determine the presence or absence of the leak based on a physical position of each sensor relative to the corresponding seal.

Returning to the configuration schematically shown by FIG. 1A, the second sensor 114 also senses a flow parameter value representative of an absence of the fluid flow past the second seal 110. Assume that the first sensor 112 and the second sensor 114 are pressure sensors, each being downstream of the first seal 108 and the second seal 110, respectively. Each sensor periodically transmits sensed pressure values to the controller 150, which the controller 150 stores over time. Because the fluid contacts the first seal 108 but not the second seal 110, the pressure value sensed by the first sensor 112 differs from the pressure value sensed by the second sensor 114. Nevertheless, in the absence of the leak, the pressure sensed by each sensor remains relatively constant over time. On this basis, the controller 150 determines the absence of the leak in either seal in the sealing assembly. Such a design can be deployed, for example, for underwater service where the purpose is to prevent ingress of water from the environment into a valve or actuator assembly.

Figure 1B:
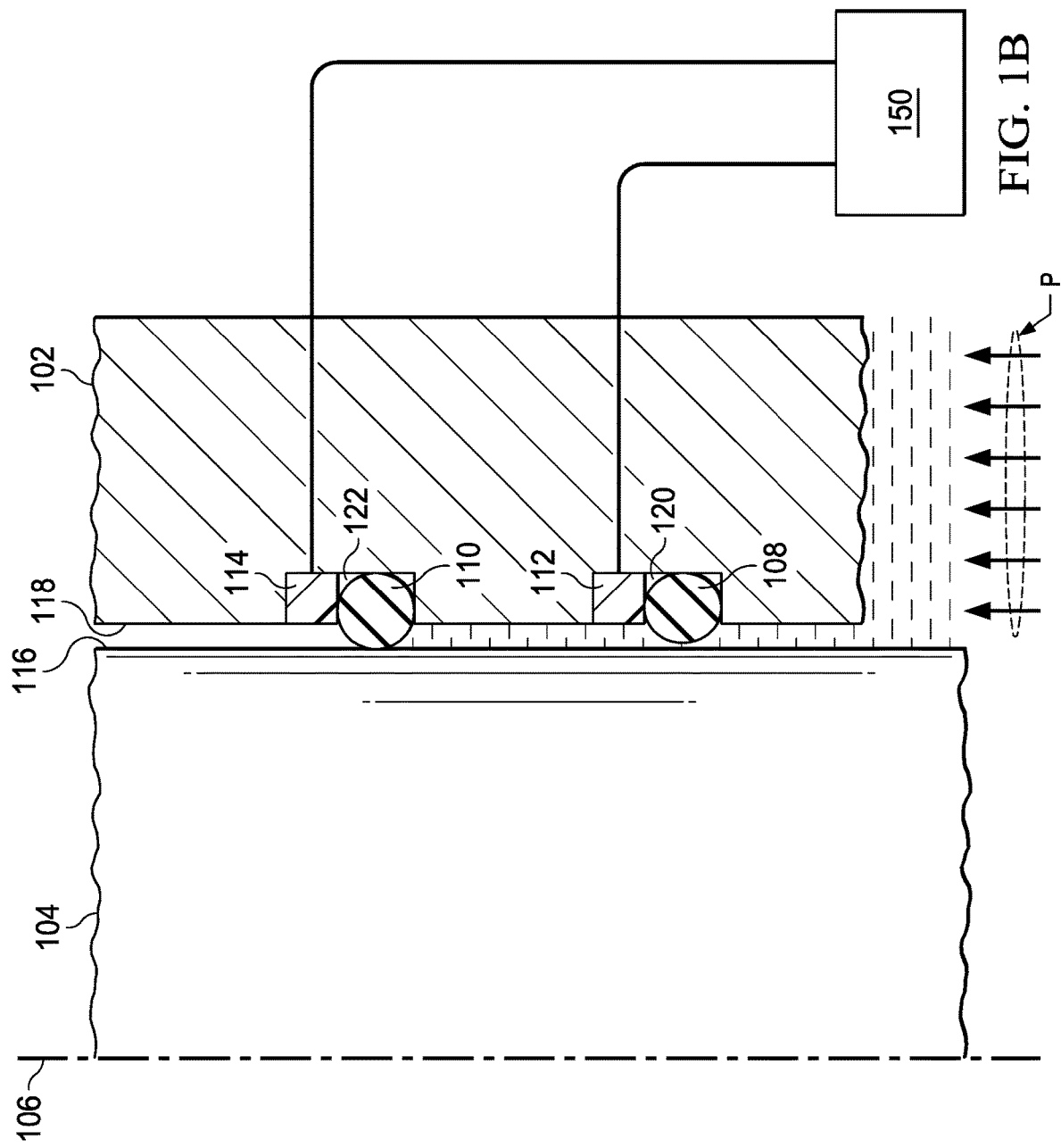
FIG. 1B is a schematic drawing of sensor system sensing a leak in the multi-seal sealing assembly of FIG. 1A.

FIG. 1B is a schematic drawing of the sensor system sensing a leak in the multi-seal sealing assembly of FIG. 1A. The presence of the leak is schematically shown by the presence of fluid past the first seal 108 in FIG. 1B. Further, the absence of fluid past the second sensor 114 in FIG. 1B indicates an absence of a leak past the second seal 110. Continuing with the example in the previous paragraph, when the fluid flows past the first seal 108, the pressure value sensed by the first sensor 112 can be different from (for example, less than) the pressure value sensed by the first sensor 112 in the absence of the leak schematically illustrated in FIG. 1A. Also, the pressure value sensed by the second sensor 114 can be different from (for example, greater than) the pressure value sensed by the second sensor 114 in the absence of the leak schematically illustrated in FIG. 1A. The controller 150 compares the change in pressure over time sensed by the first sensor 112 and the second sensor 114 to determine the presence of the leak past the first seal 108. If the fluid leaks past the second seal 110, then the pressure value sensed by the second sensor 114 can be different from (for example less than) the pressure value sensed by the second sensor 114 in the absence of the leak past the second sensor 114 schematically illustrated in FIG. 1B. The controller 150 compares the change in pressure over time sensed by the second sensor 114 before the leak past the second seal 110 to change in pressure over time sensed by the second sensor 114 after the leak past the second seal 110 to determine the leak past the second seal 110.

FIG. 2A is a schematic drawing of a multi-seal sealing assembly sealing against a body. The sealing assembly shown in FIG. 2A is substantially identical to the sealing assembly shown in FIG. 1A. Like the sealing assembly shown in FIG. 1A, the sealing assembly shown in FIG. 2A seals against a surface 216 of a tool 204 having an axis 206. Although the seals 212 and 214 are shown as being displaced from each other along a longitudinal axis 206, implementations in which the seals are displaced from each other along a transverse axis perpendicular to the longitudinal axis or along two different axes at angles to each other. The sealing assembly includes a first seal 208 and a second seal 210 in a first recess 230 and a second recess 232, respectively, formed in a surface 218 of a housing 202. Alternatively, in some implementations, the tool 104 receives one or more or all of the multiple seals. A first sensor 212 and a second sensor 214 are mounted adjacent to the first seal 208 and the second seal 210, respectively. The housing 202 is then attached to the tool 204 such that the surface 218 of the housing 202 seals the surface 216 of the tool 204 against fluid flow (represented by the arrows and the letter "P") parallel to the axis 206. The components of the sealing assembly shown in FIG. 2A operate substantially identically to corresponding components of the sealing assembly shown in FIG. 2B.

Additionally, the housing 202 of the sealing assembly shown in FIG. 2B defines a flow pathway 220 between the first seal 208 and the second seal 210. The flow pathway 220 can flow fluid toward the surface 216 of the tool 204 or allow fluid egress from the cavity between seal 208 and seal 210. The sealing assembly includes a third sensor 222 mounted to the housing 202 and fluidically coupled to the flow pathway 220. In FIGS. 2A and 2B, the third sensor 222 is shown as being mounted to a flow pathway that is separate from the flow pathway 220. In some implementations, the third sensor 222 can be positioned in the flow pathway 220 itself. The third sensor 222 can sense a third flow parameter at a level responsive to an absence of the fluid flow through the flow pathway and at a comparatively different level responsive to a presence of the fluid flow through the flow pathway 220.

In the configuration shown in FIG. 2A, the sealing assembly does not leak. That is, no fluid flows past the first seal 208 between the surface 216 and the surface 218. Assume the first sensor 212, the second sensor 214, and the third sensor 222 are load sensors. As described earlier, each load sensor includes a sensor plate that senses a force due to a contact of a fluid on the sensor plate. Also, assume that the first sensor 212 and the second sensor 214 are downstream of the first seal 208 and the second seal 210, respectively. In addition, assume that fluid flowing into the flow pathway 220 toward surface 216 of the tool 204, or out from the flow pathway 220 away from surface 216 of the tool 204 exerts a force on the third sensor 222 or a flow rate is sensed when the third sensor 222 is a flow sensor. The sensor periodically transmits load values to the controller 250, which the controller 250 stores over time. Because the fluid contacts the first seal 208, but does not contact the second seal 210 or flow into the flow pathway 220, the load value sensed by the first sensor 212 differs from the load value sensed by the second sensor 214 and the third sensor 222. Nevertheless, in the absence of the leak, the load sensed by the second sensor 214 and the third sensor 222 remain relatively constant over time. On this basis, the controller 250 determines the absence of the leak in any of the seals in the sealing assembly shown in FIG. 2A.

FIG. 2B is a schematic diagram of a sensor system sensing a leak in a second portion of the multi-seal sealing assembly of FIG. 2A. The second seal 210, the second sensor 214, the flow pathway 220, and the third sensor 222 are included in the second portion of the sealing assembly. The presence of the leak is schematically shown by the fluid contacting the second seal 210. In this configuration, the load value sensed by the second sensor 214 can be different from (for example, greater than) the load value sensed by the second sensor 214 either in the absence of the leak schematically illustrated in FIG. 2A or in the presence of leak in only the first portion (schematically illustrated in FIG. 2B). Also, the load value sensed by the third sensor 222 can be different from (for example, greater than) the load value sensed by the third sensor in the absence of the leak schematically illustrated in FIG. 2A. The controller 250 compares the change in the load value over time sensed by the second sensor 214 to determine the presence of the leak in the first seal 208. By comparing changes in the values sensed by three sensors instead of two, the controller 250 can more accurately determine the presence of the leak in the sealing assembly.

In some implementations, the controller (for example, the controller 150 or the controller 250) can be operatively coupled to an output device (for example, a display device, an audio device, a combination of them, or other output device). Upon determining the presence of the leak, the controller 250 can transmit a signal to the output device. The output device can provide an output (for example, a warning signal, such as a warning message for a warning sound or both) to communicate the presence of the leak.

Figure 3:
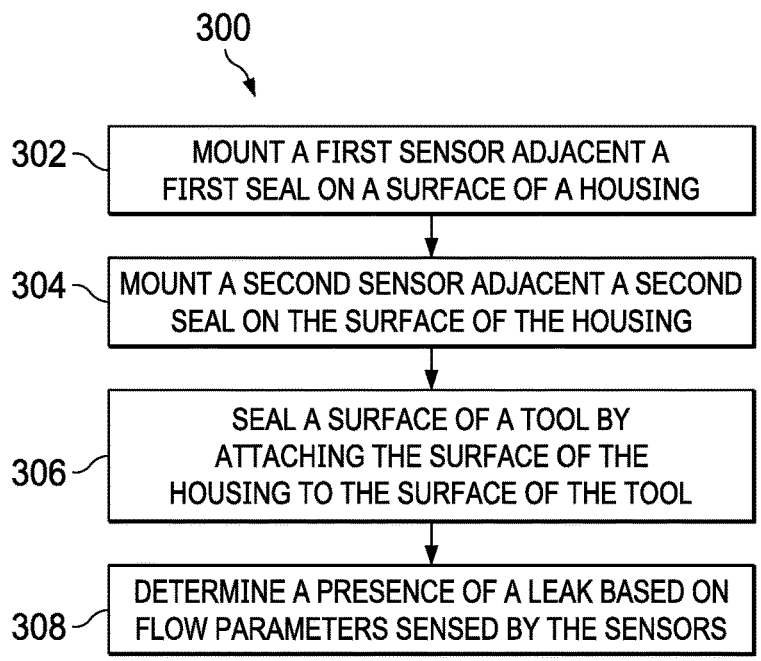
FIG. 3 is a flowchart of an example of a process for sensing a leak in a multi-seal sealing assembly.

FIG. 3 is a flowchart of an example of a process 300 for sensing a leak in a multi-seal sealing assembly. At 302, the first sensor is mounted adjacent a first seal on the surface of the housing. At 304, the second sensor is mounted adjacent a second seal on the surface of the housing. At 306, the surface of the tool is sealed by attaching the surface of the housing to the surface of the tool. At 308, the presence of a leak is determined based on flow parameters sensed by the sensors.

Figure 4:
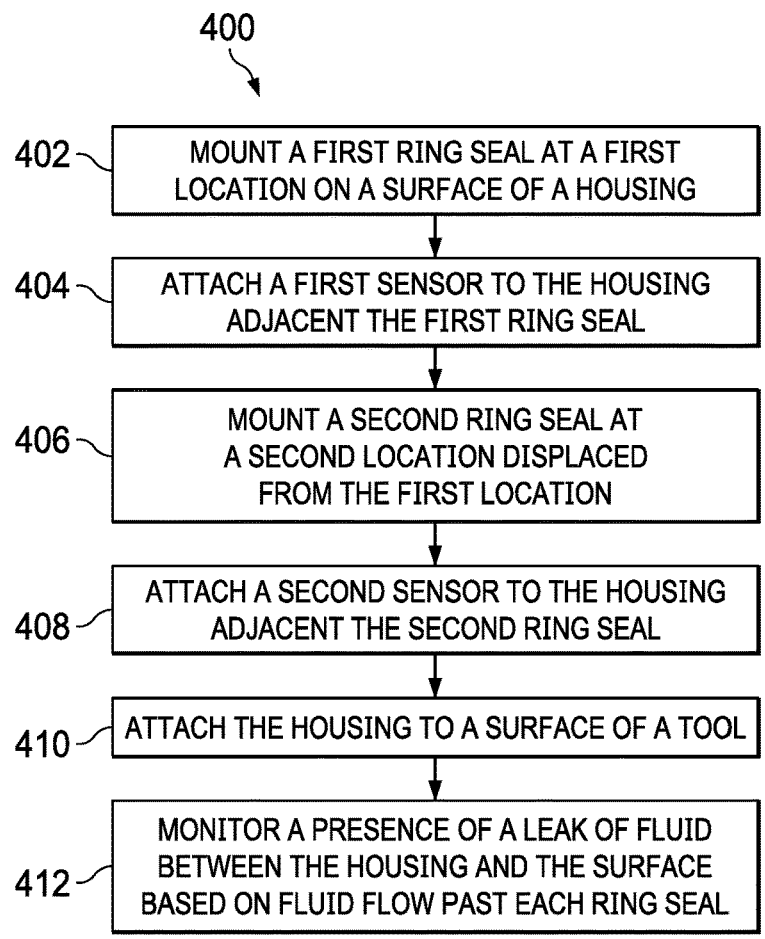
FIG. 4 is a flow chart of an example of a process for sensing a leak in a multi-seal sealing assembly.

FIG. 4 is a flow chart of an example of a process 400 for sensing a leak in a multi-seal sealing assembly. At 402, the first ring seal, for example, the first seal 108, is mounted at the first location on a surface of a housing, for example, the housing 102. At 404, a first sensor, for example, the first sensor 112, is attached to the housing adjacent the first ring seal. The first sensor can sense a first flow parameter at the first level responsive to an absence of the fluid flow past the first ring seal and the first flow parameter at the second level different from the first level responsive to a presence of the fluid flow past the first ring seal. At 406, a second ring seal, for example, the second seal 110, is mounted at a second location displaced from the first location on the surface of the housing. The second location is downstream of the first location with reference to a direction of fluid flow. At 408, a second sensor, for example, the second sensor 114, is attached to the housing adjacent the second ring seal. The second sensor can sense a second flow parameter at the third level responsive fluid flow past the second ring seal and the second flow parameter at a fourth level different from the third level responsive to a presence of the fluid flow past the second ring seal. At 410, the housing with the first ring seal, the first sensor, the second ring seal, and the second sensor is attached to a surface of the tool. The first ring seal and the second ring seal can seal against fluid flow between the surface of the housing and the surface of the tool. The second ring seal is downstream of the first ring seal with reference to the direction of the fluid flow. At 412, presence of a leak of fluid between the housing and the surface of the tool is monitored based on the presence or the absence of the fluid flow past each of the first ring seal and the second ring seal.

Thus, particular implementations of the subject matter have been described. Other implementations are within the scope of the following claims.

The invention claimed is:
1. A sealing assembly comprising:
a housing configured to receive a plurality of seals comprising a first seal and a second seal, the housing configured to mount to a surface of a tool, the plurality of seals configured to seal against fluid flow between the surface of the tool and the housing;
a first sensor mounted to the housing adjacent the first seal and between the housing and the surface of the tool, the first sensor configured to sense a first flow parameter at a first level responsive to an absence of the fluid flow past the first seal and the first flow parameter at a second level different from the first level responsive to a presence of the fluid flow past the first seal; and
a second sensor mounted to the housing adjacent the second seal, between the housing and the surface of the tool and downstream of the first sensor, the second sensor configured to sense a second flow parameter at a third level responsive to an absence of the fluid flow past the second seal and the second flow parameter at a fourth level different from the third level responsive to a presence of the fluid flow past the second seal.

2. The assembly of claim 1, wherein the housing comprises a housing surface configured to attach to the surface of the tool, wherein the housing surface defines a plurality of recesses for the corresponding plurality of seals, the plurality of recesses comprising a first recess to receive the first seal and a second recess to receive the second seal, wherein the first sensor is mounted adjacent the first recess and the second sensor is mounted adjacent the second recess.

3. The assembly of claim 2, wherein the second recess is downstream of the first recess when the housing is mounted to the tool.

4. The assembly of claim 1, wherein the housing defines a flow pathway between the first seal and the second seal, wherein the flow pathway is configured to flow fluid toward or away from the surface of the tool, wherein the assembly further comprises a third sensor mounted to the housing and fluidically coupled to the flow pathway, the third sensor configured to sense a third flow parameter at a fifth level responsive to an absence of the fluid flow through the flow pathway and at a sixth level different from the fifth level responsive to a presence of the fluid flow through the flow pathway.

5. The assembly of claim 4, wherein each of the first sensor, the second sensor, and the third sensor is a pressure sensor, a load sensor, a contact sensor, a flow rate sensor, or a temperature sensor.

6. The assembly of claim 5, wherein each of the first sensor, the second sensor, and the third sensor is a pressure sensor, wherein each of the first flow parameter, the second flow parameter, and the third flow parameter is fluid pressure.

7. The assembly of claim 5, wherein each of the first sensor, the second sensor, and the third sensor is a contact sensor, wherein each of the first flow parameter, the second flow parameter, and the third flow parameter is fluid wettability.

8. The assembly of claim 5, wherein each of the first sensor, the second sensor, and the third sensor is a load sensor, wherein each of the first flow parameter, the second flow parameter, and the third flow parameter is a force exerted by the fluid flow.

9. The assembly of claim 1, further comprising a controller operatively coupled to the plurality of seals, wherein the controller is configured to determine a presence of a leak of fluid between the housing and the surface of the tool based on the presence or the absence of the fluid flow past each of the plurality of seals.

10. The assembly of claim 9, wherein the controller is configured to determine the presence of the leak responsive to either the first sensor sensing the first flow parameter at the second level or the second sensor sensing the second flow parameter at the fourth level or both.

11. The assembly of claim 1, wherein the first seal is mounted to a surface of the housing that is configured to seal to the surface of the tool, wherein the second seal is mounted to the surface of the housing that is configured to seal to the surface of the tool.

12. A method comprising:
mounting a first ring seal at a first location on a surface of a housing;
attaching a first sensor to the housing adjacent the first ring seal, the first sensor configured to sense a first flow parameter at a first level responsive to an absence of a fluid flow past the first ring seal and the first flow parameter at a second level different from the first level responsive to a presence of the fluid flow past the first ring seal;
mounting a second ring seal at a second location displaced from the first location on the surface of the housing;
attaching a second sensor to the housing adjacent the second ring seal, the second sensor configured to sense a second flow parameter at a third level responsive to an absence of the fluid flow past the second ring seal and the second flow parameter at a fourth level different from the third level responsive to a presence of the fluid flow past the second ring seal;
attaching the housing with the first ring seal, the first sensor, the second ring seal, and the second sensor to a surface of a tool, the first ring seal and the second ring seal configured to seal against fluid flow between the surface of the housing and the surface of the tool, the second ring seal downstream of the first ring seal with reference to a direction of the fluid flow; and
monitoring a presence of a leak of fluid between the housing and the surface of the tool based on the presence or the absence of the fluid flow past each of the first ring seal and the second ring seal.

13. The method of claim 12, wherein mounting the first ring seal at the first location comprises attaching the first ring seal to a first recess formed in a housing surface of the housing, wherein attaching the first sensor to the housing adjacent the first ring seal comprises attaching the first sensor adjacent the first recess.

14. The method of claim 12, wherein mounting the second ring seal at the second location comprises attaching the second ring seal to a second recess formed in the housing surface of the housing, wherein attaching the second sensor to the housing adjacent the second ring seal comprises attaching the second sensor adjacent the second recess.

15. The method of claim 12, wherein the housing defines a flow pathway between the first ring seal and the second ring seal, wherein the flow pathway is configured to flow fluid toward the surface of the tool or away from the surface of the tool, wherein the method further comprises:
attaching a third sensor to the housing, wherein the third sensor is configured to sense a third flow parameter at a fifth level responsive to an absence of the fluid flow through the flow pathway and at a sixth level different from the fifth level responsive to a presence of the fluid flow through the flow pathway;
fluidically coupling the third sensor to the flow pathway; and
monitoring the presence of the leak of the fluid between the housing and the surface of the tool based on the presence or the absence of the fluid flow through the flow pathway.

16. The method of claim 15, wherein each of the first sensor, the second sensor, and the third sensor is a pressure sensor, a load sensor, a contact sensor, a flow rate sensor, or a temperature sensor.

17. The method of claim 16, wherein each of the first sensor, the second sensor, and the third sensor is a pressure sensor, wherein each of the first flow parameter, the second flow parameter, and the third flow parameter is fluid pressure.

18. The method of claim 16, wherein each of the first sensor, the second sensor, and the third sensor is a contact sensor, wherein each of the first flow parameter, the second flow parameter, and the third flow parameter is fluid wettability.

19. The method of claim 16, wherein each of the first sensor, the second sensor, and the third sensor is a load sensor, wherein each of the first flow parameter, the second flow parameter, and the third flow parameter is a force exerted by the fluid flow.

20. A method comprising:
mounting a first load sensor adjacent to a first ring seal on a surface of a housing;
mounting a second load sensor adjacent to a second ring seal on the surface of the housing;
attaching the surface of the housing with the first ring seal, the first load sensor, the second ring seal, and the second load sensor to a surface of a tool, the first ring seal and the second ring seal configured to prevent fluid flow between the surface of the tool and the surface of the housing, the second ring seal downstream of the first ring seal with reference to a direction of the fluid flow; and
determining a presence of a leak based on an increase in a load sensed by the first load sensor and an increase in a load sensed by the second load sensor relative to a baseline load sensed by the first load sensor and a baseline load sensed by the second load sensor in an absence of the fluid flow between the surface of the tool and the surface of the housing.

21. The method of claim 20, wherein the housing defines a flow pathway between the first ring seal and the second ring seal, wherein the flow pathway is configured to flow fluid, wherein the method further comprises:
mounting a third load sensor to the housing and fluidically coupled to the flow pathway; and
determining the presence of the leak based on an increase in a load sensed by the third load sensor relative to a baseline load sensed by the third load sensor in the absence of the fluid flow between the surface of the tool and the surface of the housing.

* * * * *